Feb. 11, 1936.  A. FLETTNER  2,030,578
AIRCRAFT
Filed Oct. 2, 1933   4 Sheets-Sheet 1

Inventor
Anton Flettner,
by
John Q. Brody
Attorney

Feb. 11, 1936.  A. FLETTNER  2,030,578
AIRCRAFT
Filed Oct. 2, 1933   4 Sheets-Sheet 2

Inventor
Anton Flettner,
by John B. Brady
Attorney

Feb. 11, 1936.                    A. FLETTNER                    2,030,578
                                   AIRCRAFT
                            Filed Oct. 2, 1933          4 Sheets-Sheet 3

Patented Feb. 11, 1936

2,030,578

UNITED STATES PATENT OFFICE 2,030,578

AIRCRAFT

Anton Flettner, Berlin, Germany

Application October 2, 1933, Serial No. 691,872
In Austria July 24, 1933

30 Claims. (Cl. 244—19)

This invention provides an aeroplane with rotating wings wherein the individual wings are interconnected by means of a lever system, which in turn is pivotally mounted with respect to the axis of rotation. The lever system may be constructed in various ways; it may comprise, for example, a simple balance beam, but it may also be formed as a universal joint in order to be able to move in all directions. With a balance beam the points of suspension of the wings only perform a tilting movement relatively to the axis of rotation.

A simple balance beam may be used when there are two rotating wings, but when there are several rotating wings a universal joint which is self adjusting in every direction is preferred, this also having the advantage that the carrying power of wings more than two in number, or their centrifugal forces mutually balance each other. The universal joint mounted on the shaft of the rotating wing system may comprise gimbals, a ball joint or the like.

The wings may be directly mounted on the balance beam or on the universal joint. They may also be pivoted, however, on the shaft of the system and interconnected with a member universally jointed to the said shaft by means of an interposed link system.

This novel arrangement of the pivotal mounting of the rotating wings is not of itself sufficient to determine a normal plane of rotation for the wings. For this purpose there is provided according to the invention a device which prevents the wings, and especially the links by means of which they are pivoted to the universal joint, from rotating about their own axes during the rocking movement of the universal joint. Such undesirable movement can be prevented by rotatably mounting the wings or their links in the universal joint and interconnecting them with the shaft of the rotating wing system by means of intermediate members, for example links, telescopic shafts, gimbals or the like, so that relative turning between the universal joint and the wings may occur but not relative turning between the wings and the shelf.

If these intermediate members are not connected to the shaft or to a direction controller for the system fixedly attached thereto, but to a controller rocking around gimbals, then the plane of rotation can be varied at will by the adjustment of said controller and thereby the aeroplane can be steered about the vertical, longitudinal and transverse axes.

The means described for influencing the position of the plane of rotation of the system are not sufficient to effect, in addition to varying the angle of incidence for steadying or controlling the plane of rotation, the conversion of the autogyro wings into a helicopter screw or vice versa. Such a conversion also necessitates the adjustment of the angle of incidence of the wings, and this can be effected through utilizing the centrifugal force, the wings for this purpose being slidably disposed with reference to their longitudinal axes. In this case a screw-threaded spindle guide arrangement or other guiding means with an inclined surface may be provided, which alters the angle of incidence of the wing during its longitudinal displacement. The wing is preferably caused to overcome during this movement an adjusted resistance (e. g. a spring or weight). With this arrangement the result is obtained that the desired variation of the angle of incidence is automatically effected in accordance with the number of revolutions. In another arrangement, hereinafter described, the automatic adjustment is effected under the action of the variation of the torque. An advantage of the automatic adjustment under the action of the centrifugal force or the torque is that the steering apparatus is not rendered unduly complicated.

If, for example, several spindle drives with varying pitch are disposed at various points of the wing, then the individual parts of the wing will be unevenly adjusted and a twist in the wing obtained.

In the following three possibilities of utilizing the automatic adjustment, or twisting, are referred to by way of example.

(1) In the state of rest, that is to say when they are not rotated, the wings, which for example are not twisted, are in the form of autogyro wings (making autogyration possible). Upon a certain number of revolutions being reached the wings are adjusted from for example —2 degrees to +8 degrees and are used as untwisted helicopter screws. If the number of revolutions drops below a certain point, then the wings are readjusted to an incidence of —2 degrees.

(2) In the state of rest, that is to say when they are not rotated, the twisted wings constructed as helicopter screws are so adjusted that the various profiles of the outer halves of the wings have an incidence of for example —4°, —3°, —2°, —1° and 0° from the outside towards the inside, so that the wings may act as autogyro wings with autogyration. If now a certain number of revolutions is reached, then the twisted wings are bodily turned for example through 8°, so that the various profiles of the outer halves of the wings have an incidence of for example +4°, +5°, +6°, +7° and +8° from the outside towards the inside. If the number of revolutions drops below a certain point, the wings are readjusted into the position which they occupied in the state of rest.

(3) In the position of rest the wings are in the autogyro position and for the time being they are not twisted (autogyration possible). After a certain number of revolutions is reached they are given a greater incidence and are twisted simultaneously, so that now they can operate as good helicopter screws. If the number of revolutions drops to a certain point then the wings return into the autogyro position (e. g. non-twisted form).

These explanations, which refer to the automatic adjustment, or twisting, do not mean that the invention is not applicable to embodiments wherein the adjustment, or twisting, is effected by the pilot with the aid of suitable transmission devices.

The invention makes it possible for an aeroplane to rise as if it were a helicopter and to continue its flight as an autogyro with the aid of an additional tractor propeller. It is also possible for the helicopter screw to be converted, for example in case of engine failure, into gyroscope wings, so that autogyration sets in and a forced landing can be made. For this reason it is advisable to insert a free wheel between the engine and the shaft of the rotating wing system.

The aeroplane may also rise in the first place vertically as a helicopter and then continue its flight after the desired altitude has been reached through inclination of the shaft of the wing system, the helicopter screw serving at the same time the purposes of traction.

In the known aeroplanes wherein a counter propeller or counter wings are unilaterally disposed, a free lateral force remains active, which causes the aeroplane to deviate from the set direction of climbing. In accordance with the invention it is possible to create a counter force through inclination of the plane of rotation, which counteracts the disturbing free lateral force of the counter propeller. In this case the counter propeller is preferably so disposed that its centre is located at about the height of the centre of the wing, but in any case above the longitudinal centre line of the fuselage, whereby undue lateral forces are avoided.

It is advantageous to mount the shaft of the rotating wing system in a forwardly inclined position with respect to the centre line of the fuselage.

Several embodiments of the invention are illustrated by way of example on the accompanying drawings.

Figure 1:
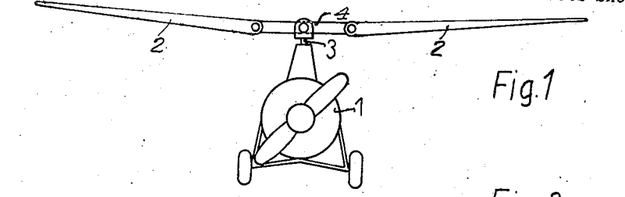
Fig. 1 is a front elevation of an aeroplane with rotating wings pivoted to a balance beam and Fig. 2 is a corresponding plan of the wings and their mounting.
Figure 2:
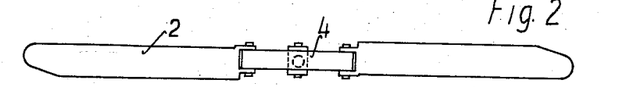

In the embodiment illustrated by Figs. 1 and 2, reference 1 denotes the aeroplane fuselage whereon the rotating wings 2 are pivotally mounted at the ends of a two-armed lever 4 which is rockably mounted on the shaft 3, the said two-armed lever being constructed after the manner of a balance beam.

Figure 3:
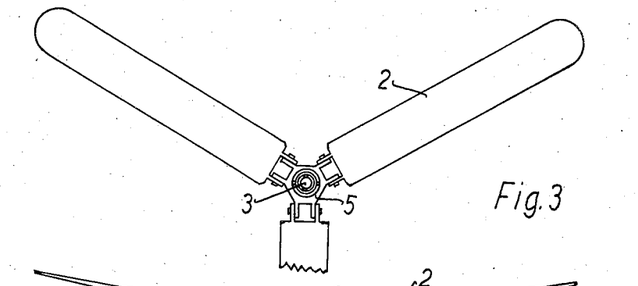
Fig. 3 is a plan of another wing mounting.

In the embodiment according to Fig. 3 the rotating wings 2 are pivotally mounted on a rocker member 5 universally jointed to the shaft 3.

Figure 4:
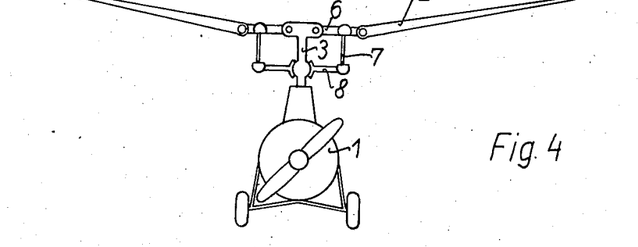
Fig. 4 is a front elevation of an aeroplane with rotating wings connected to a rocker member.

In the embodiment according to Fig. 4 the wings 2 are connected to a rocker member 8 pivoted to the shaft 3 under the interposition of a lever system. As shown, wings 2 are pivotally connected with the shaft 3 by means of links 6 pivotally mounted thereon, rods 7 being pivotally connected to the links 6 and the rods in turn being pivoted to a rocker member 8 universally or pivotally jointed to the shaft 3.

Figure 5:
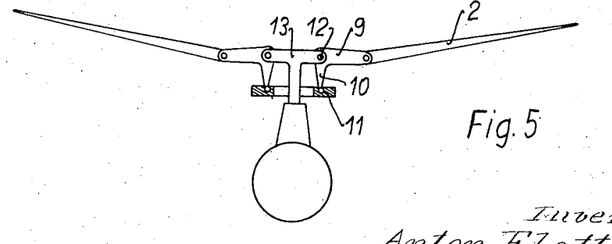
Fig. 5 is a front elevation of an arrangement wherein the wings are pivoted to bell-crank levers.

According to Fig. 5 the wings are pivoted to bell crank levers the free arms of which are pivoted to a freely movable connecting member. Each rotating wing 2 is pivoted to one arm 9 of a bell crank lever, the other arm 10 of which engages with its end a freely movable connecting member 11. The bell crank levers 9, 10 are mounted at their points of rotation 12 on an intermediate member 13 attached to the shaft 3. In this arrangement the up and down movement of the wings is mutually transmitted through the bell crank levers to the freely movable connecting member 11. It is immaterial whether the connecting member 11 is disposed above or below the pivot points of the wings.

Figure 6:
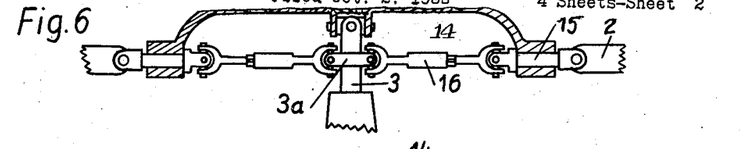
Fig. 6 is a longitudinal sectional view of another arrangement of wing mounting embodying a rocker member.

According to Fig. 6 the wings or their links are rotatably mounted in the rocker member. Rotatably disposed round the periphery of the rocker member 14, which is universally jointed to the shaft 3, there are links 15 pivoted to the wings 2. The connection of these links 15 to the shaft 3 or to the direction controller 3a rigidly secured to the shaft has for its object to prevent the wings from rotating about their longitudinal axes with respect to the axis of rotation of the system, for which purpose universally jointed telescopic intermediate members 16 are provided.

Figures 7, 8, 9, 10:
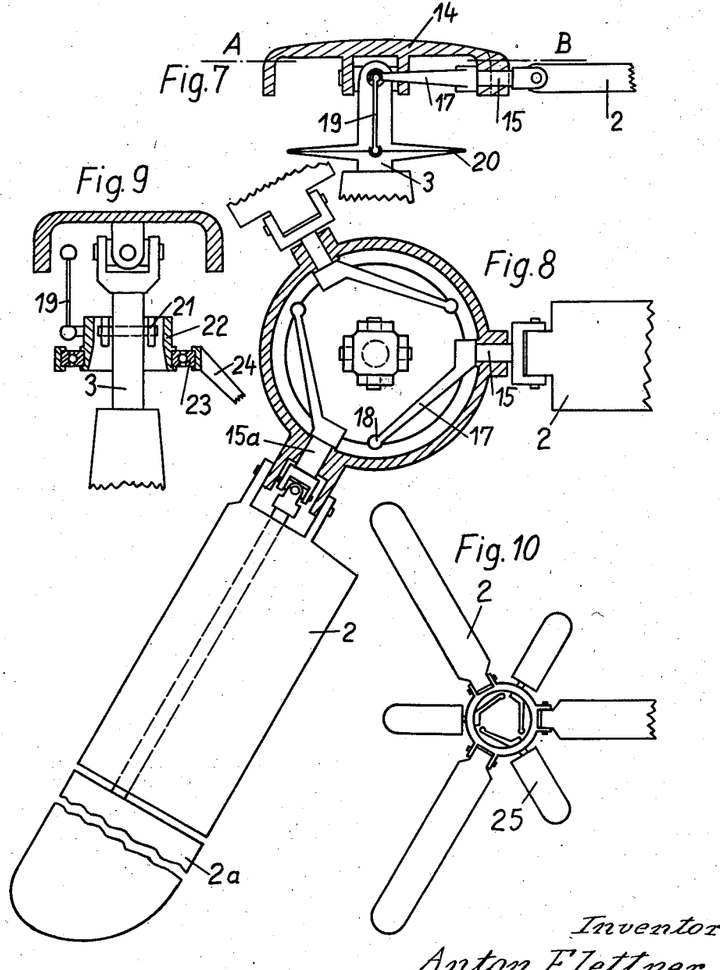
Figs. 7 and 8 show a modification of the last mentioned arrangement, Fig. 7 being a longitudinal sectional view and Fig. 8 a corresponding plan, partly in section on the line A—B of Fig. 7.
Fig. 9 is a longitudinal sectional view of another modification.
Fig. 10 is a plan view of an arrangement incorporating additional steering wings.

In the arrangement illustrated by Figs. 7 and 8 each of the links 15, which are rotatable relatively to the rocker member 14, is rigidly secured to a lever 17 the free end of which terminates at a point which is offset at an angle of 90° with respect to the point of application of the lever and is there pivotally connected, preferably through a ball joint, to a direction controller 20 rigidly secured to the shaft 3.

It will be seen from Fig. 8 that it is not always necessary to prevent variation of the angle of incidence of the whole wing 2, but only of a part 2a. Instead of the outer part 2a of the wing another part of the wing surface, e. g., the rear edge of the wing could be selected. In such cases the said wing parts are connected to the levers 17 through pins 15a, universal joints and auxiliary shafts. The normal wing portion 2 participates in this case in the adjustments due to movements of the rocker member 14.

The embodiment shown in Fig. 9 is similar to Fig. 8. However, the levers are pivoted to a direction controller rocking on a universal joint. The arrangement may be such that a controller 22 rocking on the gimbals 21 is provided, a ball bearing ring 23 being mounted on the periphery of the controller and the steering rod 24 being attached to said ring. The rods 19 are connected to the controller and their free ends are in engagement with the levers 17 disposed on the rotatable pins 15. With this arrangement it is possible to steer the aeroplane about the vertical, transverse and longitudinal axes without making use of the usual steering surfaces.

As shown in Fig. 10 there may be disposed between the wings proper two small steering wings 25 to which the steering means are attached.

Figure 11:
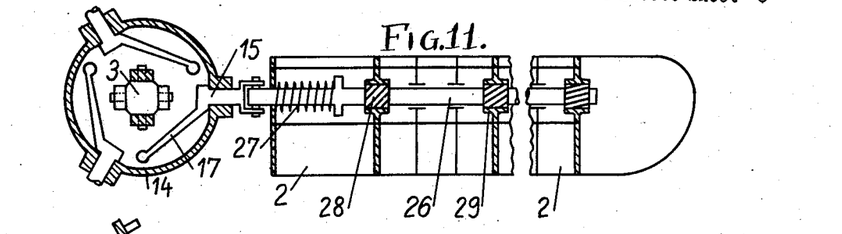
Fig. 11 is a longitudinal sectional view showing an arrangement wherein provision is made for twisting the wing.

Fig. 11 shows an arrangement of the wings in the case where the centrifugal force is utilized for the purpose already mentioned. The longitudinal shaft 26 of the wing 2 is pivoted to the rocker member 14 universally jointed to the shaft 3. The wing 2 is slidable along the longitudinal shaft and is kept in its normal position by a spring 27 or the like. Mounted upon the longitudinal shaft 26 there are screw-threaded spindle guides 28, the nut portions 29 of which are rigidly connected to the wing 2. If the centrifugal force developed during rotation overcomes the resistance of the interposed spring 27 the wing 2 slides outwards away from the axis of the shaft 3 and is turned due to the guides 28, 29. This turning of the wing will be different at various points thereof if the pitch of the spindle guides is different, whereby twisting is obtained.

Figure 12:
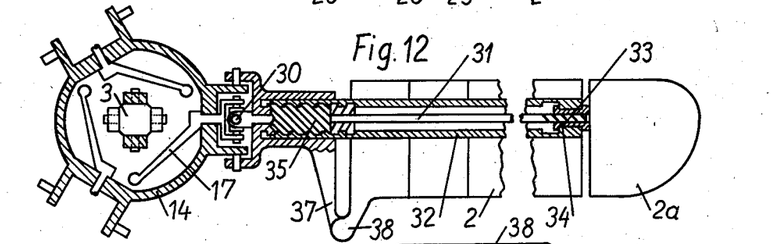
Fig. 12 is a view similar to Fig. 11 but showing a modification.
Figures 13, 14:
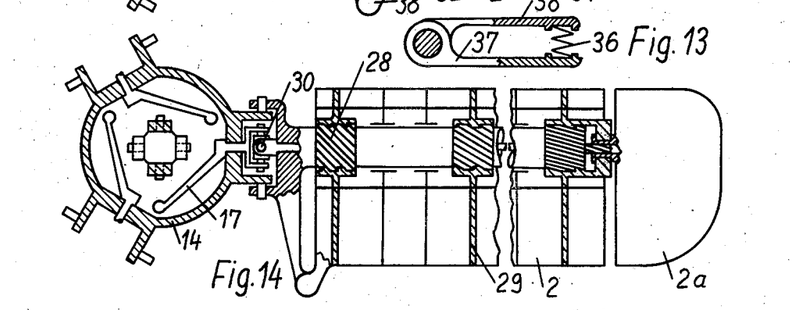
Fig. 13 is a cross sectional view of Fig. 12.
Fig. 14 is also a view similar to Fig. 11 but showing still another modification.

The arrangement illustrated by Figs. 12 and 13 makes it possible simply to turn the wing 2 instead of twisting it. Fig. 12 also shows how the outer part 2a of the wing can be adjusted or controlled separately or independently. The lever 17 rotatably mounted in the rocker member 14 is provided with gimbals 30. From these an auxiliary shaft 31 leads through the hollow sleeve 32 and a screw-threaded spindle guide 33 (which is guided in a second auxiliary shaft 34 mounted in the sleeve 32) to the outer wing part 2a. Under the action of the centrifugal force the main wing portion 2 is thrust outwards being thereby turned due to the screw-threaded guide 35, but only after the resistance of a spring 36 (Fig. 13) has been overcome. This spring is disposed between the lever arms 37 and 38. Due to the lever transmission the interposed spring can be relatively weak. When the wing 2 is automatically turned, the outer wing part 2a is also turned under the action of the screw-threaded spindle drive 33, through the same or a smaller or larger angle according to the pitch of the spindle 33 and without the actual position of the auxiliary shaft being altered.

Fig. 14 again shows the method of twisting by the provision of a plurality of screw-threaded spindle guides, as in Fig. 11. At the same time the independent control of the outer wing part 2a shown in Fig. 12 is illustrated.

Figure 15:
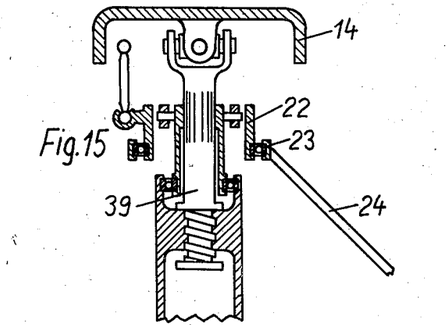
Fig. 15 is a vertical sectional view of the control mechanism employed with the arrangements of Figs. 11 to 14.

Fig. 15 shows the shaft 3 with mechanism destined to utilize the torque of the said shaft for the aforesaid purpose. This device is so constructed that the rocker member 14 is not directly mounted on the shaft 3 but is universally jointed to an axle 39 screwed into the shaft, so that thereby an additional variation of the angle of incidence of the wings may be effected by means of the controller 22 connected to the axle 39.

Figure 16:
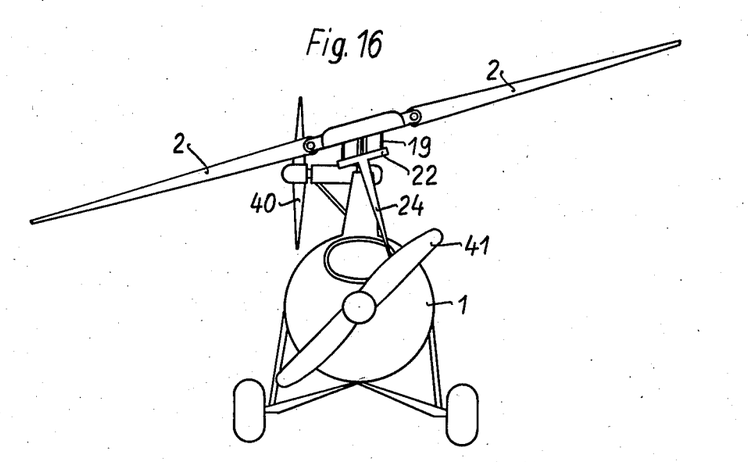
Fig. 16 illustrates the application of the invention to an aeroplane in conjunction with a counter propeller.
Figure 17:
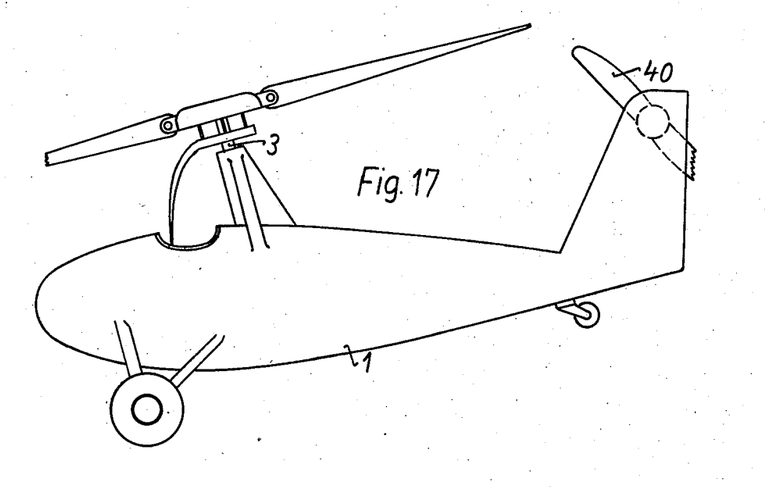
Fig. 17 is a side elevation corresponding to Fig. 16.

In the aeroplane shown in Figs. 16 and 17 the torque of the helicopter screw is compensated by means of a counter propeller 40 disposed for example at the rear end of the fuselage. The action of the counter propeller creates a disturbing free force which deflects the aeroplane from the intended direction especially when leaving the ground. According to the invention this free disturbing force of the counter propeller is counteracted by inclining the plane of rotation of the wings 2, the adjustment into the inclined position being effected by means of the steering rod 24, controller 22 and rods 19. In this arrangement a separate propeller 41 is shown for the traction of the aeroplane.

Such inclining of the plane of rotation of the wings may also be utilized for compensating the disturbing free lateral force that is created when, for the purpose of counteracting the torque of the helicopter screw, counter wings are unilaterally, e. g. rearwardly, disposed, such counter wings lying in the stream of the helicopter screw.

From Fig. 17 it will be seen that the shaft 3 is built into the fuselage 1 in a forwardly inclined position. The centre of the counter propeller 40 is disposed higher than the centre line of the fuselage, and in this case level with the centre portion of the helicopter screw.

I claim:—

1. Aeroplane with rotatable wings, comprising, in combination, an upstanding rotatable shaft, a plurality of bell crank levers pivoted transversely to the shaft with their arms extending substantially horizontally and substantially vertically, a plurality of wings pivoted to the substantially horizontal arms of the levers, and a movable member connecting the substantially vertical arms of the levers.

2. Aeroplane with rotatable wings, comprising in combination, a substantially vertical rotatable shaft, a rocker member articulated by a universal joint to the shaft, a plurality of shafts supported substantially radially in the rocker member, a plurality of wings pivotally supported by the radially-supported shafts, and means preventing rotation with respect to the vertical shaft of the radially-supported shafts about their axes.

3. Aeroplane with rotatable wings, comprising, in combination, a substantially-vertical rotatable shaft, a rocker member articulated by a universal joint to the shaft, a plurality of shafts supported substantially radially in the rocker member, a plurality of wings pivotally supported by the radially-supported shafts, and a plurality of Cardan shafts, the outer members of which are secured to the inner ends of the radially-supported shafts and the inner members of which are secured to the vertical shaft.

4. Aeroplane with rotatable wings, comprising, in combination, a substantially vertical rotatable shaft, a rocker member articulated by a universal joint to the shaft, a plurality of shafts supported substantially radially in the rocker member, a plurality of wings pivotally supported by the radially-supported shafts, a controller flange on the vertical shaft, levers secured to the inner ends of the radially-supported shafts, each lever subtending an angle of substantially 90° in a plane normal to the vertical shaft, and tie members connecting the ends of the levers with the controller flange.

5. Aeroplane with rotatable wings, comprising, in combination, a substantially vertical rotatable shaft, a rocker member articulated by a universal joint to the shaft, a plurality of shafts supported substantially radially in the rocker member, a plurality of Cardan shafts, the outer members of said Cardan shafts being secured to the inner ends of the radially supported shafts and the inner members of said Cardan shafts being secured to the vertical shaft, and a plurality of composite wings, the main parts of said wings being tangentially pivoted to the rocker member, border parts of said wings being supported by said main parts, and the outer ends of the radially-supported shafts being secured to said border parts.

6. Aeroplane with rotatable wings, comprising, in combination, a substantially vertical rotatable shaft, a rocker member articulated by a universal joint to the shaft, a plurality of shafts supported substantially radially in the rocker member, a plurality of composite wings, the main parts of said wings being tangentially pivoted to the rocker member, border parts of said wings being supported by said main parts and the outer ends of said radially supported shafts being secured to said border parts, levers secured to the inner ends of the radially supported shafts and each subtending an angle of substantially 90° in a plane normal to the vertical shaft, a controller flange on the vertical shaft, and tie members connecting the ends of the levers with the controller flange.

7. Aeroplane with rotatable wings, comprising, in combination, a substantially vertical rotatable shaft, a rocker member articulated by a universal joint to the shaft, a plurality of shafts supported substantially radially in the rocker member, a plurality of composite wings, the main parts of said wings being tangentially pivoted to the rocker member, border parts of said wings being supported by said main parts and the outer ends of the radially supported shafts being secured to said border parts, levers secured to the inner ends of the radially supported shafts and each subtending an angle of substantially 90° in a plane normal to the vertical shaft, a controller member universally pivotable about the vertical shaft, tie members connecting the ends of the levers with the controller member, and means serving to move the controller member to determine the plane of rotation of the wings and thereby steer the aeroplane about the vertical, transverse and longitudinal axes.

8. Aeroplane with rotatable wings, comprising, in combination, a substantially vertical rotatable shaft, a rocker member articulated by a universal joint to the shaft, a plurality of shafts supported substantially radially in the rocker member, a plurality of wings pivotally supported by the radially-supported shafts, a controller member universally pivotable about the vertical shaft, levers secured to the inner ends of the radially supported shafts and each subtending an angle of substantially 90° in a plane normal to the vertical shaft, tie members connecting the ends of the levers with the controller member, and means serving to move the controller member to determine the plane of rotation of the wings and thereby steer the aeroplane about the vertical, transverse and longitudinal axes.

9. Aeroplane with rotatable wings, comprising, in combination, a substantially vertical rotatable shaft, a rocker member articulated by a universal joint to the shaft, a plurality of wings supported by the rocker member, a plurality of auxiliary wings articulated to the rocker member and steering mechanism acting upon the auxiliary wings.

10. Aeroplane with rotatable wings, comprising, in combination, a substantially vertical rotatable shaft, a rocker member articulated by a universal joint to the shaft, a plurality of wings tangentially pivoted to the rocker member, a plurality of shafts supported substantially radially in the rocker member, a plurality of auxiliary wings pivotally supported by the radially-supported shafts, and means preventing rotation of the radially-supported shafts with respect to the vertical shaft about their axes.

11. Aeroplane with rotatable wings, comprising, in combination, a substantially vertical rotatable shaft, a rocker member articulated by a universal joint to the shaft, a plurality of wings tangentially pivoted to the rocker member, a plurality of shafts supported substantially radially in the rocker member, a plurality of auxiliary wings pivotally supported by the radially-supported shafts, a controller flange on the vertical shaft, levers secured to the inner ends of the radially-supported shafts, each lever subtending an angle of substantially 90° in a plane normal to the vertical shaft, and tie members connecting the ends of the levers with the controller flange.

12. Aeroplane with rotatable wings, comprising, in combination, a substantially vertical rotatable shaft, a rocker member articulated by a universal joint to the shaft, a plurality of wings tangentially pivoted to the rocker member, a plurality of shafts supported substantially radially in the rocker member, a plurality of auxiliary composite wings, the inner parts of said composite wings being tangentially pivoted to the rocker member, the outer parts of said composite wings being supported by said inner parts and the outer ends of said radially supported shafts being secured to said outer parts, levers secured to the inner ends of the radially supported shafts and each subtending an angle of substantially 90° in a plane normal to the vertical shaft, a controller flange on the vertical shaft, and tie members connecting the ends of the levers with the controller flange.

13. Aeroplane with rotatable wings, comprising, in combination, a substantially vertical rotatable shaft, a rocker member articulated by a universal joint to the shaft, a plurality of wings tangentially pivoted to the rocker member, a plurality of shafts supported substantially radially in the rocker member, a plurality of auxiliary wings, screw-and-nut means connecting the auxiliary wings with freedom of axial movement under centrifugal force to the radially-supported shafts, a controller member universally pivotable about the vertical shaft, levers secured to the inner ends of the radially supported shafts and each subtending an angle of substantially 90° in a plane normal to the vertical shaft, tie members connecting the ends of the levers with the controller member, and means serving to move the controller member to determine the plane of rotation of the wings and thereby steer the aeroplane about the vertical, transverse and longitudinal axes.

14. Aeroplane with rotatable wings, comprising, in combination, a substantially vertical rotatable shaft, a plurality of bell crank levers pivoted transversely to the shaft with their arms extending substantially horizontally and substantially vertically, a plurality of wings pivoted to the substantially horizontal arms of the levers, a movable member connecting the substantially vertical arms of the levers, and means automatically varying the angle of incidence of the wings under the action of centrifugal force.

15. Aeroplane with rotatable wings, comprising, in combination, a substantially vertical rotatable shaft, a rocker member articulated by a universal joint to the shaft, a plurality of shafts supported substantially radially in the rocker member, a plurality of wings, screw-and-nut means connecting the wings with freedom of axial movement under centrifugal force to the radially-supported shafts, and a plurality of Cardan shafts, the outer members of which are secured to the inner ends of radially-supported shafts and the inner members of which are secured to the vertical shaft.

16. Aeroplane with rotatable wings, comprising, in combination, a substantially vertical rotatable shaft, a rocker member articulated by a universal joint to the shaft, a plurality of shafts supported substantially radially in the rocker member, a plurality of Cardan shafts, the outer members of said Cardan shafts being secured to the inner ends of the radially supported shafts and the inner members of said Cardan shafts being secured to the vertical shaft, a plurality of hollow sleeves tangentially pivoted to the rocker member, a plurality of composite wings, screw-and-nut means connecting the main parts of said wings with freedom for axial movement under centrifugal force to said hollow sleeves, border parts of said wings supported by said main parts, a plurality of auxiliary shafts universally articulated to the outer ends of the radially supported shafts and extending through the hollow sleeves, and screw-and-nut means connecting said border parts to said auxiliary shafts.

17. Aeroplane with rotatable wings, comprising, in combination, a substantially vertical rotatable shaft, a rocker member articulated by a universal joint to the shaft, a plurality of shafts supported substantially radially in the rocker member, a plurality of hollow sleeves tangentially pivoted to the rocker member, a plurality of composite wings, screw-and-nut means connecting the main parts of said wings with freedom for axial movement under centrifugal force to said hollow sleeves, border parts of said wings supported by said main parts, a plurality of auxiliary shafts universally articulated to the outer ends of the radially supported shafts and extending through the hollow sleeves, screw-and-nut means connecting said border parts to said auxiliary shafts, levers secured to the inner ends of the radially supported shafts and each subtending an angle of substantially 90° in a plane normal to the vertical shaft, a controller member universally pivotable about the vertical shaft, tie members connecting the ends of the levers with the controller member, and means serving to move the controller member to determine the plane of rotation of the wings and thereby steer the aeroplane about the vertical, transverse and longitudinal axes.

18. Aeroplane with rotatable wings, comprising, in combination, a substantially vertical rotatable shaft, a rocker member articulated by a universal joint to the shaft, a plurality of wings tangentially pivoted to the rocker member, a plurality of shafts supported substantially radially in the rocker member, a plurality of composite auxiliary wings supported with freedom of axial movement under centrifugal force by the radially-supported shafts, screw-and-nut means connecting each part of the wings separately to its respective supporting shaft, said screw-and-nut means having increasing pitch towards the outer parts of the wings, a controller member universally pivotable about the vertical shaft, levers secured to the inner ends of the radially supported shafts and each subtending an angle of substantially 90° in a plane normal to the vertical shaft, tie members connecting the ends of the levers with the controller member, and means serving to move the controller member to determine the plane of rotation of the wings and thereby steer the aeroplane about the vertical, transverse and longitudinal axes.

19. Aeroplane with rotatable wings, comprising, in combination, a substantially vertical rotatable shaft, a rocker member articulated by a universal joint to the shaft, a plurality of shafts supported substantially radially in the rocker member, a plurality of Cardan shafts the outer members of said Cardan shafts being secured to the inner ends of the radially supported shafts and the inner members of said Cardan shafts being secured to the vertical shaft, a plurality of hollow sleeves tangentially pivoted to the rocker member, a plurality of composite wings supported with freedom for axial movement under centrifugal force by said hollow sleeves, screw-and-nut means connecting each of the main parts of each wing to its respective hollow shaft, said screw-and-nut means being of increasing pitch from the innermost outwards, the end parts of said wings supported by said main parts, a plurality of auxiliary shafts universally articulated to the outer ends of the radially supported shafts and extending through the hollow sleeves, and screw-and-nut means connecting said end parts to said auxiliary shafts.

20. Aeroplane with rotatable wings, comprising, in combination, a substantially vertical rotatable shaft, a rocker member articulated by a universal joint to the shaft, a plurality of shafts supported substantially radially in the rocker member, a plurality of wings, screw-and-nut means connecting the wings with freedom of axial movement under centrifugal force to the radially-supported shafts, resilient means urging the wings oppositely to the centrifugal force, and a plurality of Cardan shafts, the outer members of which are secured to the inner ends of the radially-supported shafts and the inner members of which are secured to the vertical shaft.

21. Aeroplane with rotatable wings, comprising, in combination, a substantially vertical rotatable shaft, a rocker member articulated by a universal joint to the shaft, a plurality of shafts supported substantially radially in the rocker member, a plurality of hollow sleeves tangentially pivoted to the rocker member, a plurality of composite wings, screw-and-nut means connecting the main parts of said wings with freedom for axial movement under centrifugal force to said hollow sleeves, resilient means urging said wings oppositely to the centrifugal force, border parts of said wings supported by said main parts, a plurality of auxiliary shafts universally articulated to the outer ends of the radially supported shafts and extending through the hollow sleeves, screw-and-nut means connecting said border parts to said auxiliary shafts, levers secured to the inner ends of the radially supported shafts and each subtending an angle of substantially 90° in a plane normal to the vertical shaft, a controller member universally pivotable about the vertical shaft, tie members connecting the ends of the levers with the controller member, and means serving to move the controller member to determine the plane of rotation of the wings and thereby steer the aeroplane about the vertical, transverse and longitudinal axes.

22. Aeroplane with rotatable wings, comprising, in combination, a substantially vertical rotatable standard having a screw threaded portion, a shaft in axial alignment with the standard and having a screw-threaded portion in engagement with the screw-threaded portion of said standard, a rocker member articulated by a universal joint to said shaft, a plurality of shafts supported substantially radially in the rocker member, a plurality of wings pivotally supported by the radially-supported shafts, a sleeve rotatable with the vertical shaft and constrained against axial movement relative to the standard, said shaft being free for limited rotation with respect to said standard under the torsional drag of the wings, a controller member universally pivotable about the sleeve, levers secured to the inner ends of the radially supported shafts and each subtending an angle of substantially 90° in a plane normal to the vertical shaft, tie members connecting the ends of the levers with the controller member, and means serving to move the controller member to determine the plane of rotation of the wings and thereby steer the aeroplane about the vertical, transverse and longitudinal axes.

23. Aeroplane with rotatable wings, comprising, in combination, a substantially vertical rotatable shaft, a rocker member articulated by a universal joint to the shaft, a plurality of wings tangentially pivoted to the rocker member, a plurality of shafts supported substantially radially in the rocker member, a plurality of auxiliary composite wings, the inner parts of said composite wings being tangentially pivoted to the rocker member, the outer parts of said composite wings being supported by said inner parts and the outer ends of said radially supported shafts being secured to said outer parts, levers secured to the inner ends of the radially supported shafts and each subtending an angle of substantially 90° in a plane normal to the vertical shaft, a controller flange on the vertical shaft, tie members connecting the ends of the levers with the controller flange, and a counter propeller disposed in the slip-stream of the wings, above the centre line of the aeroplane fuselage and approximately as high as the centre of the wings, the plane of rotation of the wings being adjustable to an inclined position in counter-action to the free lateral force of said counter propeller.

24. Aeroplane with rotatable wings, comprising, in combination, a substantially vertical rotatable shaft, a rocker member articulated by a universal joint to the shaft, a plurality of shafts supported substantially radially in the rocker member, a plurality of Cardan shafts, the outer members of said Cardan shafts being secured to the inner ends of the radially supported shafts and the inner members of said Cardan shafts being secured to the vertical shaft, a plurality of composite wings, the main parts of said wings being tangentially pivoted to the rocker member, border parts of said wings being supported by said main parts, and the outer ends of the radially supported shafts being secured to said border parts, and a counter propeller disposed at the rear end of the aeroplane fuselage, the plane of rotation of the wings being adjustable to an inclined position in counter-action to the free lateral force of said counter propeller.

25. Aeroplane with rotatable wings, comprising, in combination, a substantially vertical rotatable shaft, a rocker member articulated by a universal joint to the shaft, a plurality of shafts supported substantially radially in the rocker member, a plurality of wings pivotally supported by the radially-supported shafts, means preventing rotation with respect to the vertical shaft of the radially-supported shafts about their axes, and a counter wing system unilaterally disposed in the slip-stream of the wings, the plane of rotation of the wings being adjustable to an inclined position in counter-action to the free lateral force of said counter wing system.

26. Aeroplane with rotatable wings, comprising, in combination, a rotatable shaft forwardly inclined with respect to the centre line of the aeroplane, a rocker member articulated by a universal joint to the shaft, a plurality of wings tangentially pivoted to the rocker member, a plurality of shafts supported substantially radially in the rocker member, a plurality of auxiliary wings pivotally supported by the radially-supported shafts, a controller flange on the vertical shaft, levers secured to the inner ends of the radially-supported shafts, each lever subtending an angle of substantially 90° in a plane normal to the vertical shaft, and tie members connecting the ends of the levers with the controller flange.

27. Aeroplane with rotatable wings, comprising, in combination, a rotatable shaft forwardly inclined with respect to the centre line of the aeroplane, a rocker member articulated by a universal joint to the shaft, a plurality of shafts supported substantially radially in the rocker member, a plurality of composite wings, the main parts of said wings being tangentially pivoted to the rocker member, border parts of said wings being supported by said main parts and the outer ends of said radially supported shafts being secured to said border parts, levers secured to the inner ends of the radially-supported shafts and each subtending an angle of substantially 90° in a plane normal to the vertical shaft, a controller flange on the vertical shaft, and tie members connecting the ends of the levers with the controller flange.

28. Aeroplane with rotatable wings, comprising, in combination, a shaft forwardly inclined with respect to the centre line of the aeroplane, a rocker member articulated by a universal joint to the shaft, a plurality of shafts supported substantially radially in the rocker member, a plurality of wings pivotally supported by the radially-supported shafts, and a plurality of Cardan shafts, the outer members of which are secured to the inner ends of the radially-supported shafts and the inner members of which are secured to the vertical shaft.

29. Aeroplane with rotatable wings, comprising, in combination, a substantially vertical, divided rotatable shaft, a clutch connecting the divided parts of said shaft, a rocker member articulated by a universal joint to the upper part of said shaft, a plurality of wings tangentially pivoted to the rocker member, a plurality of shafts supported substantially radially in the rocker member, a plurality of auxiliary wings pivotally supported by the radially-supported shafts, and means preventing rotation of the radially supported shafts with respect to the vertical shaft about their axes.

30. Aeroplane with rotatable wings, comprising, in combination, a divided rotatable shaft forwardly inclined with respect to the centre line of the aeroplane, a clutch connecting the divided parts of said shaft, a rocker member articulated by a universal joint to the upper part of said shaft, a plurality of shafts supported substantially radially in the rocker member, a plurality of wings pivotally supported by the radially-supported shafts, a controller flange on the vertical shaft, levers secured to the inner ends of the radially-supported shafts, each lever subtending an angle of substantially 90° in a plane normal to the vertical shaft, and tie members connecting the ends of the levers with the controller flange.

ANTON FLETTNER.